United States Patent
North

[11] Patent Number: 5,419,704
[45] Date of Patent: May 30, 1995

[54] KEYBOARD COVER

[76] Inventor: Marilyn A. North, Box 1030, Carman, Manitoba, Canada, R0G 0J0

[21] Appl. No.: 145,580

[22] Filed: Nov. 4, 1993

[30] Foreign Application Priority Data

Nov. 10, 1992 [CA] Canada .................................. 2082578

[51] Int. Cl.⁶ ............................................. B41J 29/12
[52] U.S. Cl. ................... 434/227; 312/208.3; 400/714
[58] Field of Search ................. 434/227; 400/713, 714; 312/208.3, 284

[56] References Cited

U.S. PATENT DOCUMENTS

| 2,530,910 | 11/1950 | Schnabel | 312/284 |
| 3,762,528 | 10/1973 | Garman | 400/714 |
| 4,075,465 | 2/1978 | Funk et al. | 434/227 |
| 4,167,208 | 9/1979 | Plattner | 312/284 |
| 4,294,557 | 10/1981 | Blanchard et al. | 400/714 |
| 4,449,763 | 5/1984 | Barnett | 400/714 |
| 4,580,984 | 4/1986 | Madaus | 434/227 |
| 4,922,980 | 5/1990 | Parker | 400/713 |
| 5,096,317 | 3/1992 | Phillippe | 434/227 |

Primary Examiner—Paul J. Hirsch
Attorney, Agent, or Firm—Murray E. Thrift; Adrian D. Battison; Stanley G. Ade

[57] ABSTRACT

A keyboard training aid has a support resting on the keyboard around the text entry keys and an opaque cover pivotally mounted on the support. The cover extends over the text input keys so that they cannot be seen by a training operator. Two apertures in the top cover are aligned between the keyboard operator and the home keys in the center row so that the home keys can be viewed.

3 Claims, 4 Drawing Sheets

KEYBOARD COVER

FIELD OF THE INVENTION

The present invention relates to the training of persons using computer, word processor, typewriter or the like keyboards.

BACKGROUND

One difficulty in the training of typists and others using keyboards is training the user not to look at the keys when typing. The present invention provides a training aid for this purpose.

SUMMARY

According to the present invention there is provided a keyboard training aid for a keyboard having a predetermined array of text input keys, said aid comprising support means engageable with the keyboard at positions spaced from the array of text input keys and opaque cover means mounted on the support means to extend over the array of keys at a position spaced thereabove so as to hide the array of keys from the view of the user.

The text input keys include all of the keys usually used for typing texts, including numerical keys, punctuation keys and such control keys as shift, space and backspace.

In the preferred embodiments of the invention, the cover is a panel hinged to the support, which extends across the back and along the sides of the key array to be hidden from view. It is also preferred that the cover has two apertures on lines of sight from the operator to the "home" keys for the keyboard, usually the "F" and "J" keys. For better visibility, the support may have one or more windows admitting light onto the keys.

BRIEF DESCRIPTION OF THE DRAWINGS

In the accompanying drawings, which illustrate an exemplary embodiment of the present invention.

DETAILED DESCRIPTION

Figure 1:
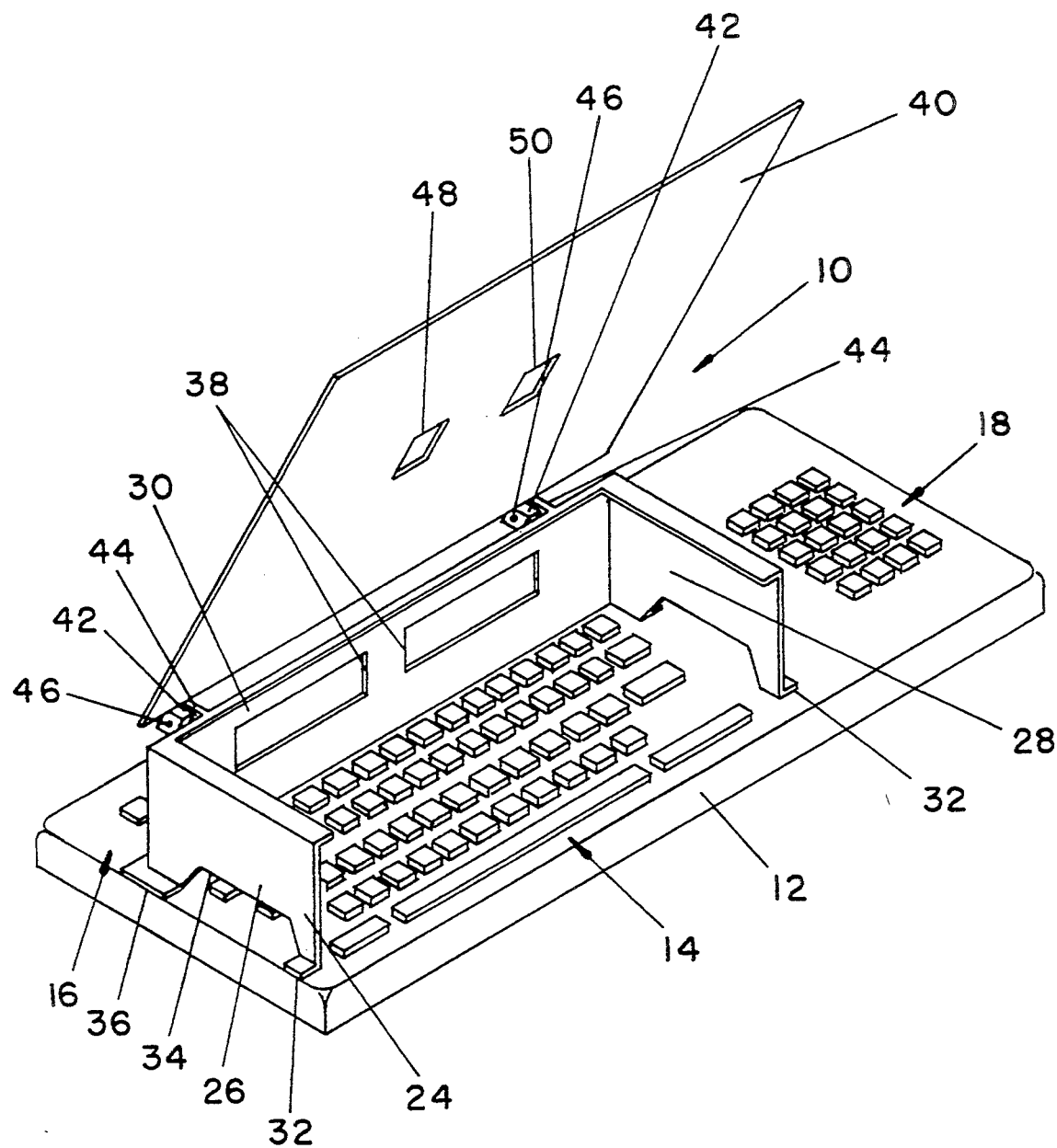
FIG. 1 is an isometric view of the training aid on a keyboard, in the open condition.
Figure 2:
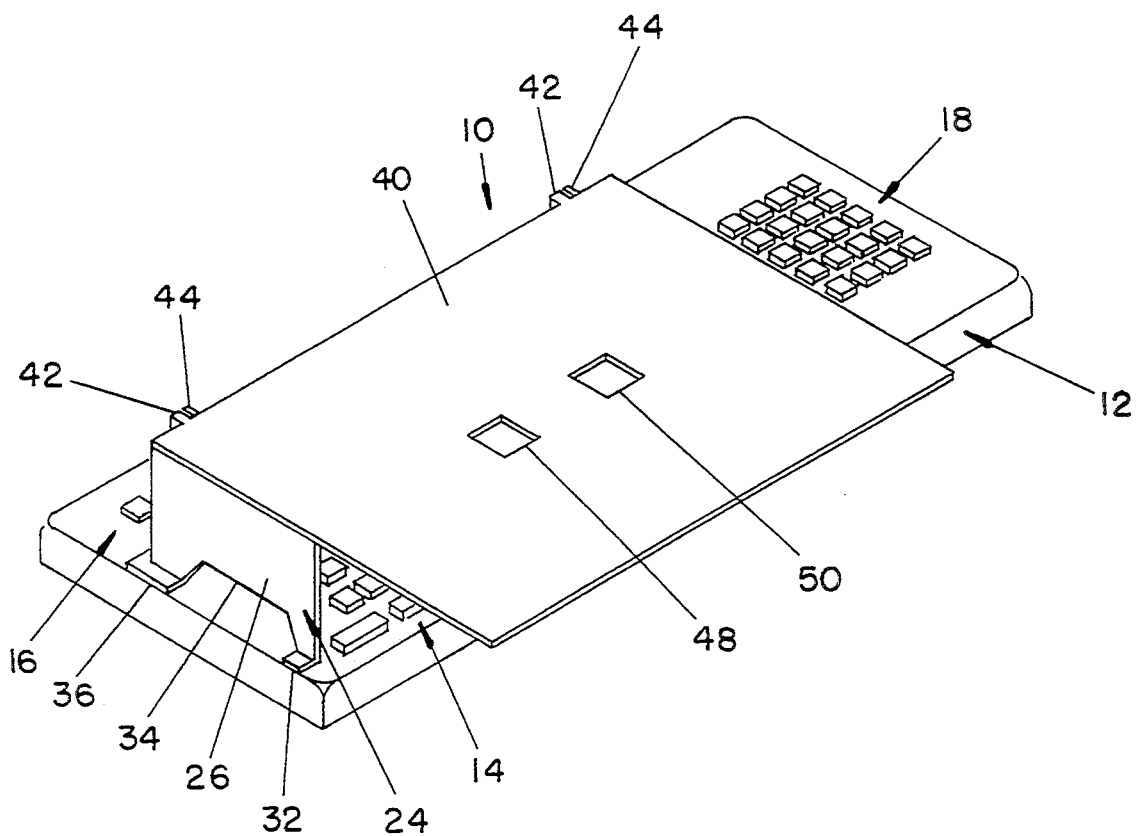
FIG. 2 is a view like FIG. 1, with the training aid closed.
Figure 3:
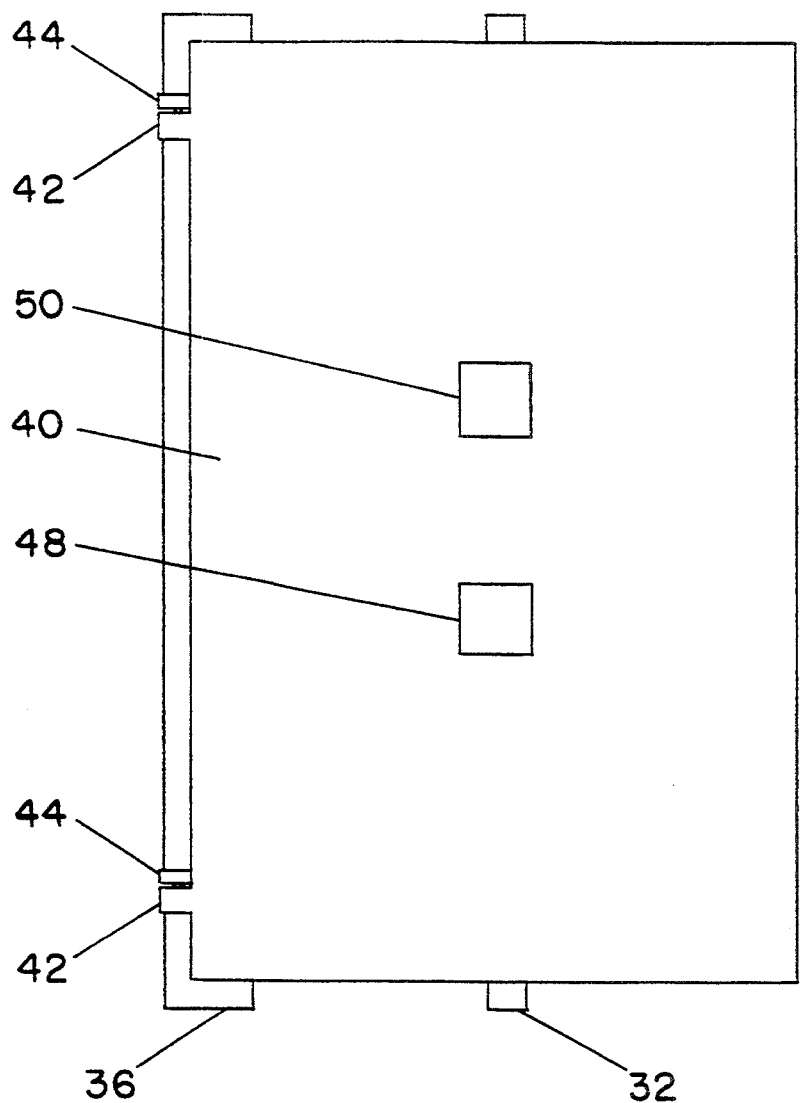
FIG. 3 is a plan view of the training aid.
Figure 4:
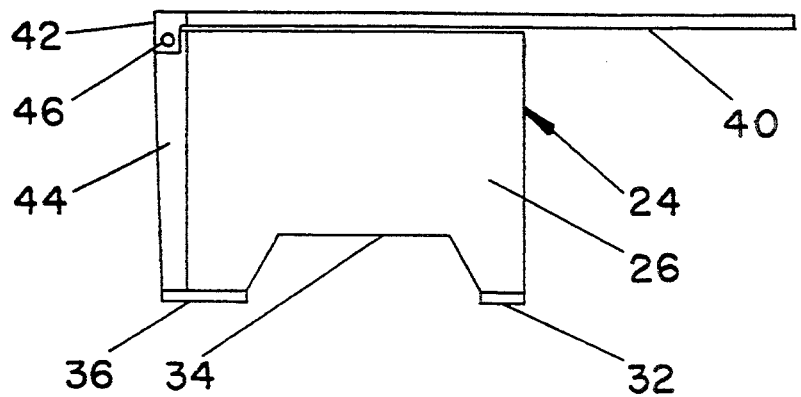
FIG. 4 is a side view of the training aid.

Referring to the accompanying drawings, FIGS. 1 and 2 illustrate a training aid according to the present invention set onto a conventional computer keyboard 12. The keyboard has an array of text input keys 14 that generally matches the array of keys found on a conventional typewriter. The keyboard also includes a set of function keys 16 and a calculator type numeric keypad 18. It is conventional that the keys for typing the characters "F" and "J" in the center row of keys are considered "home" keys for orienting the hands and fingers in a neutral position on the keyboard.

The training aid 10 includes a support 24 resting on the keyboard and projecting upwardly from it. The support has two sides, panels 26 and 28 and a back panel 30. At the base of each side panel, at the front, is a foot 32 in the form of a short flange extending along the outer side of the panel. Immediately rearwardly of the foot 32 is a notch 34 in the bottom of the side panel. A base flange 36 extends along the back panel along the side panels between the back panel and the notches 34. The feet 32 and the base flange 36 rest on the housing of a conventional keyboard without interfering with any of the keys.

Figure 5:
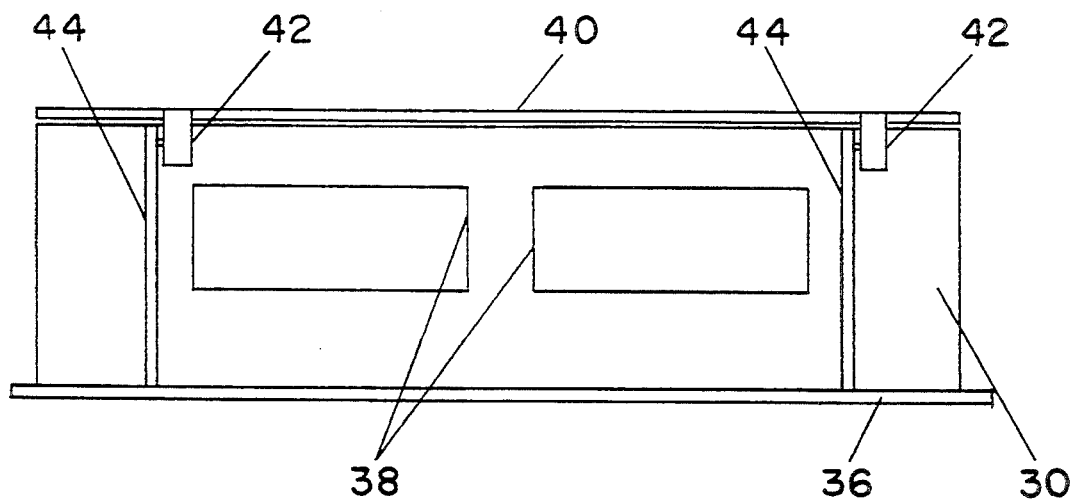
FIG. 5 is a back view of the training aid.

As illustrated most particularly in FIGS. 1 and 5, two windows 38 are formed in the back panel 30.

The aid 10 has an opaque, rectangular cover panel 40. It has two lugs 42 spaced along its rear edge. Lugs 42 engage respective ones of two flanges 44 extending vertically along the back panel 30. The lugs 42 and flanges 44 are connected by horizontal pins 46 so that the cover panel can pivot between the open position illustrated in FIG. 1 and the closed, in use position illustrated in FIG. 2.

Figure 6:
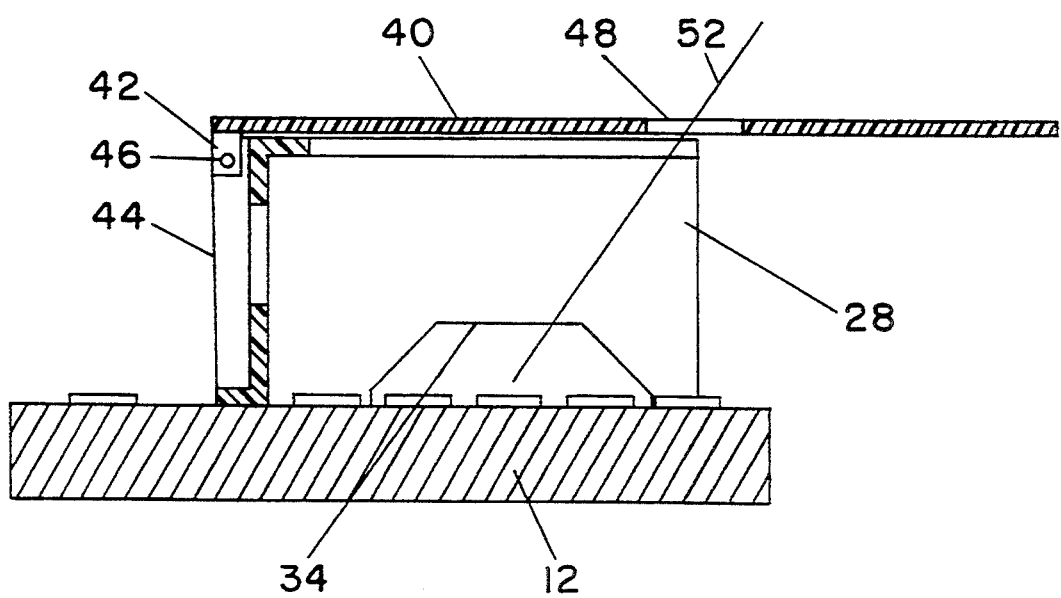
FIG. 6 is a cross section along line 6—6 of FIG. 2.

The cover panel 40 has two apertures 48 and 50 that are positioned so that lines of sight from the keyboard user to the two home keys "F" and "J" will pass through the respective apertures. This is illustrated most particularly in FIG. 6 where the line of sight is designated 52. The windows 38 in the back panel 30 ensure that there is adequate light under the cover panel 40 that the home keys can, in fact, be seen.

The present training aid is extremely simple and can be manufactured and sold inexpensively. It is particularly suitable for use in such environments as schools.

While one embodiment of the present invention has been described in the foregoing, it is to be understood that other embodiments are possible within the scope of the invention and ace intended to be included within the appended claims.

I claim:

1. A keyboard training aid for a keyboard having a predetermined array of text input keys, said aid comprising support means engageable with the keyboard at positions spaced from the array of text input keys, an opaque cover means comprising a panel and pivot means mounting the panel on the support means for pivotal movement beween a key concealing position extending over the array of keys at a position spaced thereabove so as to hide the array of keys from the view of the user and a key exposing position upstanding from the support means and exposing the keys to the view of the user.

2. A training aid according to claim 1 including two apertures in the cover means located on lines of sight from a keyboard operator to two home keys on the keyboard.

3. A training aid according to claim 2 including light-admitting window means in the support means.

* * * * *